United States Patent [19]

Igarashi

[11] Patent Number: 4,704,638

[45] Date of Patent: Nov. 3, 1987

[54] IMAGE INFORMATION READING DEVICE

[75] Inventor: Yosuke Igarashi, Yokohama, Japan

[73] Assignee: Kabushiki Kaisha Toshiba, Kawasaki, Japan

[21] Appl. No.: 745,941

[22] Filed: Jun. 18, 1985

[30] Foreign Application Priority Data

| Jun. 18, 1984 | [JP] | Japan | 59-124681 |
| Jun. 25, 1984 | [JP] | Japan | 59-130540 |
| Jun. 25, 1984 | [JP] | Japan | 59-130541 |

[51] Int. Cl.$^4$ .......................... H04N 1/21; H04N 1/04
[52] U.S. Cl. .................... 358/296; 358/285; 358/286
[58] Field of Search ............... 358/296, 285, 286, 293; 178/17 R, 23 R; 33/1 M

[56] References Cited

U.S. PATENT DOCUMENTS

| 2,721,109 | 10/1955 | Ross | 346/29 |
| 3,886,371 | 5/1975 | Lloyd | 358/285 X |
| 4,200,788 | 4/1980 | Agulnek | 250/235 |
| 4,245,259 | 1/1981 | Pick | 358/285 |
| 4,409,625 | 10/1983 | Ogasawara | 358/288 |
| 4,476,496 | 10/1984 | Thaler | 358/296 X |
| 4,495,409 | 1/1985 | Baji et al. | 250/211 |

FOREIGN PATENT DOCUMENTS

3200266A1 9/1982 Fed. Rep. of Germany .
3206620A1 9/1983 Fed. Rep. of Germany .

*Primary Examiner*—E. A. Goldberg
*Assistant Examiner*—Linda M. Peco
*Attorney, Agent, or Firm*—Schwartz, Jeffery, Schwaab, Mack, Blumenthal & Evans

[57] ABSTRACT

An image information reading device for optically scanning an original document placed on a document base with use of an optical system including a light source and a beam condensing fiber lens and a reading device including a photoelectric converter to thereby read out the image information of the document; comprising an adjusting member for adjusting the vertical positions of guide members reciprocatably supporting and guiding the reading device to achieve a parallel relation between parts in the reading device, the fiber lens whose optical axis is disposed parallel to the document, and a printed circuit substrate mounted with circuits for processing of an output signal of the photoelectric converter and disposed parallel to the document surface and under the fiber lens, whereby the apparatus can be made thin and small in weight. Further, the respective parts of the reading device are fixed to a single block, thus improving the assembling accuracy of the respective parts.

22 Claims, 11 Drawing Figures

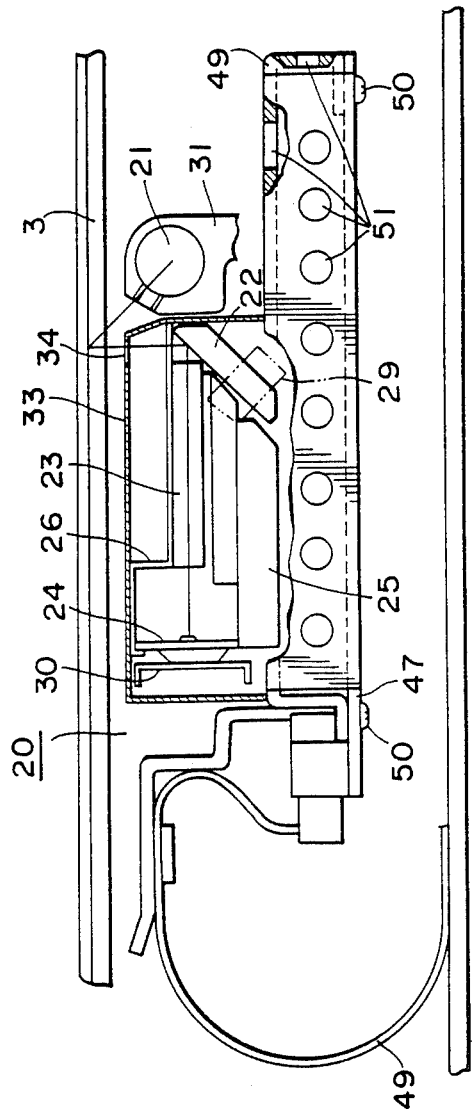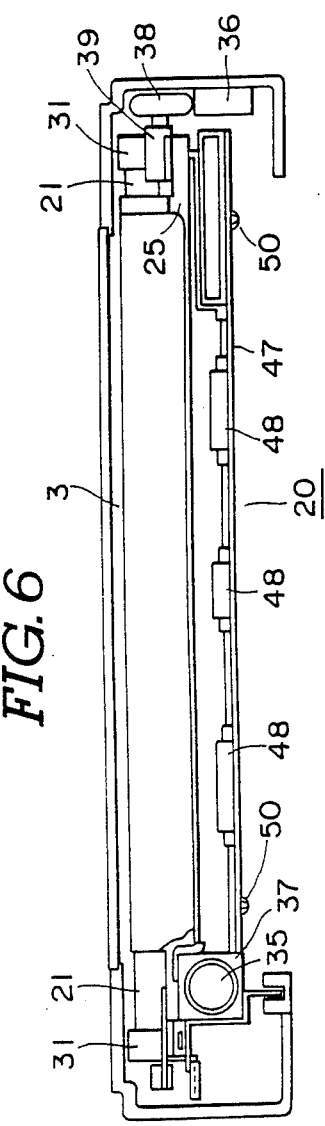

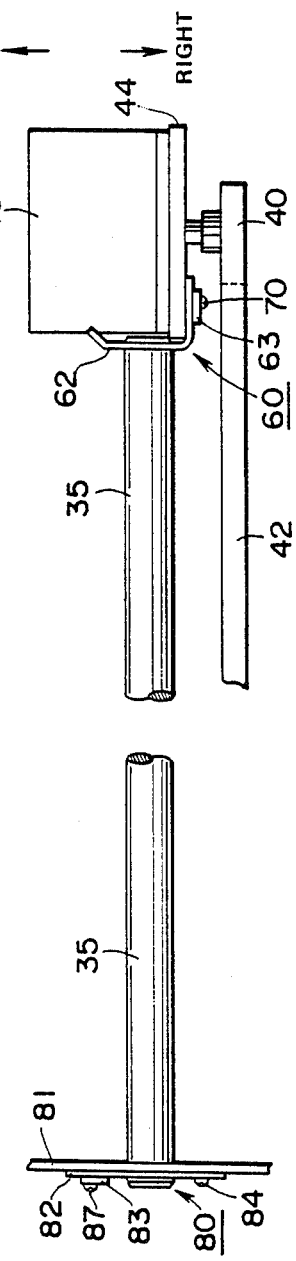
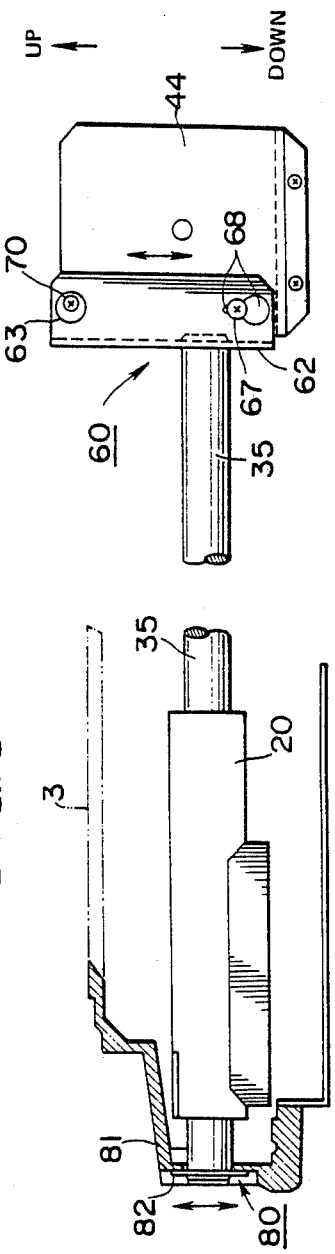

FIG. 9
(a)
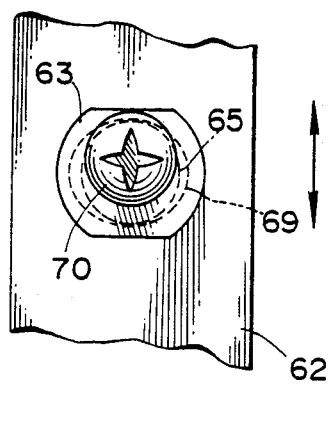
(b)
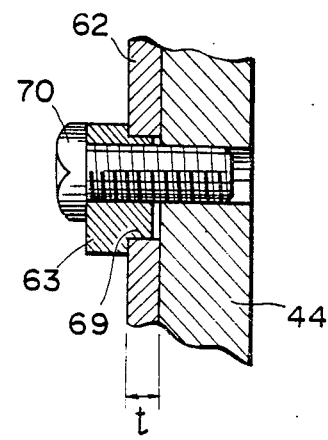
FIG. 10
(a)
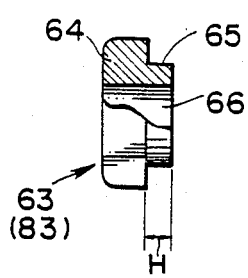
(b)
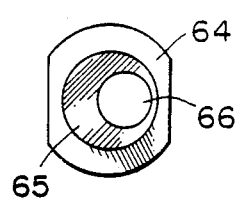

FIG.11
(a)
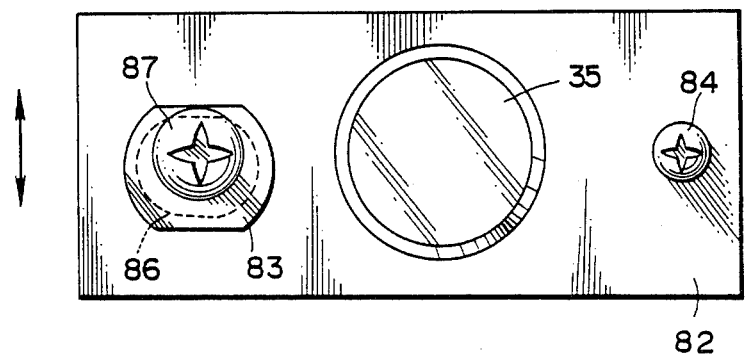
(b)
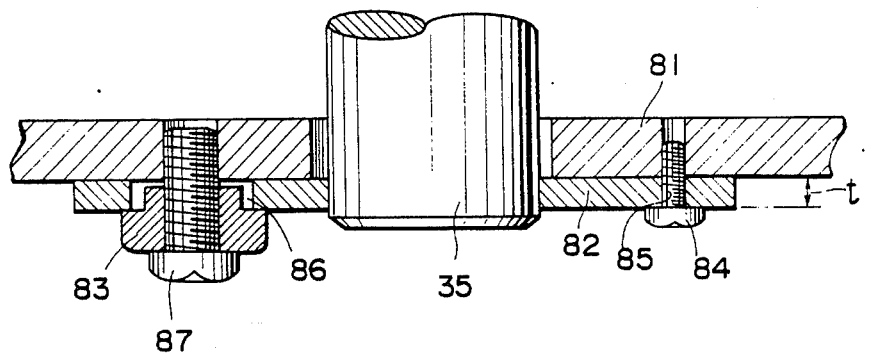

IMAGE INFORMATION READING DEVICE

BACKGROUND OF THE INVENTION

1. Field of the Invention

The present invention relates to image information reading devices for use in a copying machine, facsimile equipment and the like which optically scans an original document placed on a document base and reads the image information of the document, and more specifically, to an improved image information reading device in which a scanner comprising a light source, an optical system and a photoelectric converter is made thin and small in size, and its assembling accuracy and its vertical adjustment are improved.

2. Description of the Prior Art

Recently, there has been developed a heat transfer colour copying machine which uses, for example, a plural-colour heat transfer ink ribbon as a colour ink donor. A conventional colour copying machine typically comprises a device for reading the image information of an original document (scanner section) and an image forming section for thermally transferring an image information read by the reading device onto a paper. More concretely, the information reading device optically scans the original document placed on the document base to thereby read the image information of the document as a light colour signal, and the image information thus read is sent to the image forming section. The image forming section receives the image information sent from the information reading device, converts it to colour information indicative of corresponding inks of the heat transfer ink ribbon, selects corresponding ink portions of the ribbon in accordance with the respective colour information, and thermally transfer ink of the selected ink portions, one colour by another, to a paper by means of a thermal head sequentially, thereby achieving colour copy.

In the information reading device used in such a colour copying machine, a scanner comprises a light source for emitting light toward an original document placed on a document base, an optical system including a beam condensing fiber lens for guiding a reflected light from the document, and a photoelectric converter for converting the reflected light guided by the optical system to an electric signal. The scanner is reciprocated parallel to the lower surface of the document base to thereby optically scan and read the information of the document. In this case, the scanner, which is movably supported on a guide shaft and a guide rail as guide members disposed mutually parallely under the document base, is guided along the guide shaft and guide rail so as to move parallel to the lower surface of the document base.

In the conventional information reading device, however, the guide shaft and guide rail are fixedly mounted to a frame of the device and thus the vertical position or parallelism of the scanner with respect to the lower surface of the document base is determined by the manufacturing and assembling accuracies of the frame. The same explanation holds true for the focus position of the optical system. For such reasons, in the case of a colour copying machine with especially a high required resolution, it is impossible to obtain such satisfactory vertical position or parallelism only with the dimensional accuracy of the device at the time of assembling, and therefore troublesome adjustment is necessary after the frame has been assembled.

Further, in such a conventional device, since the beam condensing fiber lens is disposed in such a manner that the optical axis of the lens is substantially perpendicular to the surface of the document, the overall height of the scanner is high, for example, about 60 mm. Accordingly, if the printed circuit substrates are positioned under the scanner, the information reading device cannot be made thin, therefore, the substrates are disposed next to the fiber lens. However, the device usually requires three substrates, each having a height of 53 mm when vertically disposed for a signal amplifier circuit an A/D converter, etc. resulting in a thick device.

Furthermore, in this type of device, a unit mounted with the mirror and lens, a unit mounted with the photoelectric converter and a unit mounted with the light source are provided separately, so that the assembling accuracy between these units cannot be made high. In order to improve the assembling accuracy, it is considered to provide an adjusting mechanism. However, this requires the increased number of necessary parts, making it difficult to render the device small, thin and light in weight.

SUMMARY OF THE INVENTION

In view of the above circumstances, it is an object of the present invention to provide an image information reading device which allows easy and accurate adjustment of the focusing position of an optical system and of the parallel relation with respect to an object to be read.

Another object of the present invention is to provide an image information reading device which can be made thin, small in size and light in weight with high assembling accuracy.

In accordance with the present invention, adjusting means are provided for adjusting at least the vertical positions of guide members for guiding a scanner which comprises a light source, an optical system and a photoelectric converter and is reciprocated in parallel with the surface of an original document. The adjusting means include vertical adjustment plates fixedly supporting both ends of the guide members and movable in its vertical direction, eccentric cams whose rotation causes vertical movement of the vertical adjustment plates within a predetermined range, and means for fixing the vertical adjustment plates at a desired position.

According to the present invention, there is provided a picture image information reading device which comprises a light source for emitting light toward the surface of an original document, a beam condensing fiber lens for guiding a reflected light from the document, means for photoelectrically converting a light after passed through the fiber lens, and a printed circuit substrate mounted with a circuit for processing an electric signal produced by the photoelectric converting means; wherein a light direction changing means is provided for directing the reflected light toward a direction substantially parallel with the document surface, the fiber lens is provided on a path of the light after passed through the light direction changing means so that the optical axis of the fiber lens coincides with the direction of the light changed by the light direction changing means, and the printed circuit substrate is provided parallel with the document surface under the light direction changing means and fiber lens, thereby realizing a thin device.

Further, in the present invention, an image information reading device comprises a light source, a light direction changing means, a beam condensing fiber lens and a photoelectric converting means, wherein the light direction changing means, the fiber lens and the photoelectric converting means are constructed in a single block, thus improving the assembling accuracy of the respective parts.

With such an arrangement of the present invention, the focusing position adjustment of the optical system and the parallel adjustment with respect to an image to be read can be readily made, the information reading device can be made thin, small in size and light in weight, and the assembling accuracy of the parts can be enhanced.

BRIEF DESCRIPTION OF THE DRAWINGS

In the accompanying drawings:

FIG. 4 is a sectional view taken along line A—A' in FIG. 3;

FIG. 6 is a sectional view taken along line B—B' in FIG. 3;

FIG. 7 is a top plan view of a major section of the reading device including adjusting means;

FIG. 8 is a side elevational view of FIG. 7;

FIG. 9 (a) is a front view of a first adjusting means;

FIG. 9 (b) is a side sectional view of FIG. 9 (a);

FIG. 10 (a) shows a side view, partially in section, of an eccentric cam;

FIG. 11 (b) is a rear view of FIG. 10 (a);

FIG. 12 (a) is a front view of a vertical adjustment plate for explaining a second adjusting means; and FIG. 13 (b) is a sectional view of FIG. 11 (a) when viewed from its side.

DESCRIPTION OF THE PREFERRED EMBODIMENT

Figure 1:
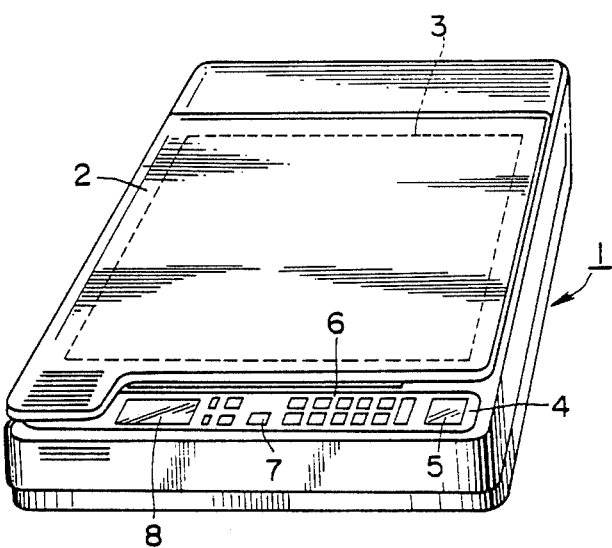
FIG. 1 is a perspective view of an embodiment of the image information reading device in accordance with the present invention.
Figure 2:
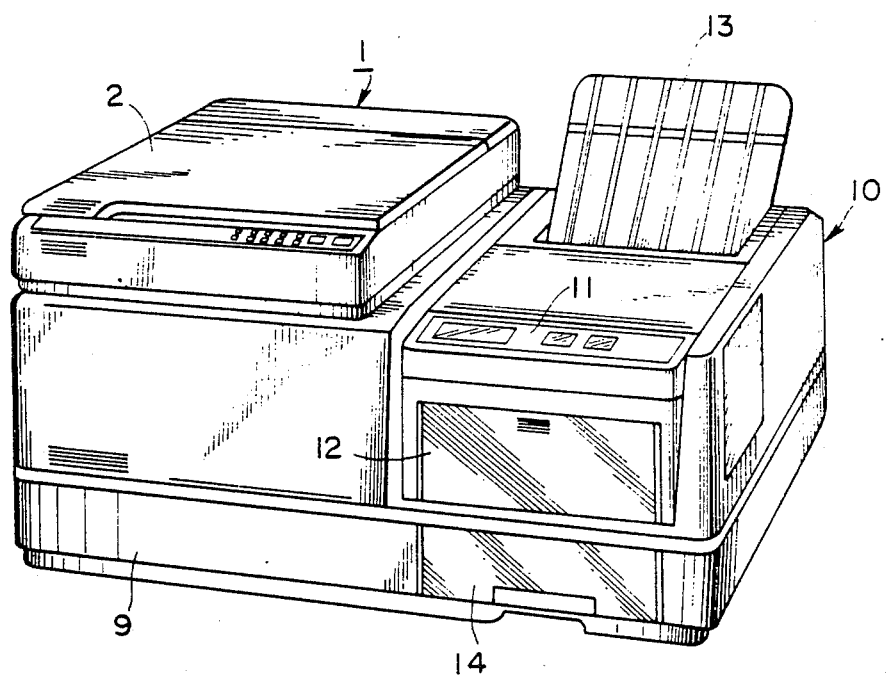
FIG. 2 is a perspective view showing a state when the reading device is set in a heat transfer colour copying machine.

Referring to FIGS. 1 and 2, an image information reading apparatus 1 is provided at its upper face with an original document cover 2 hinged to the body of the apparatus 1. The cover 2 is provided on an original document base (made of a transparent glass) 3 so that an original document is placed between the base 3 and the cover 2. In the image information reading device 1, a scanner (which will be detailed later) is reciprocated parallel along the lower surface of the original document base 3, whereby the original document placed on the base 3 is optically scanned and the image information of the original is read out as a colour signal of light. Further, the image information reading device 1 is provided at its front upper side with a control panel 4 which includes a copy key 5 for starting a copying operation, ten keys 6 for setting the number of papers on which the same image is to be copied, an indicator 7 for displaying this number and in indicator 8 for displaying various states of copying operations.

An image information outputted from the image information reading device 1 is sent to an image forming section 10 which is removably provided at the right upper side of a copying machine body 9. In the picture image forming section 10, the picture image information sent from the information reading apparatus 1 is converted to colour information corresponding to the ink colours of a heat transfer ink ribbon, an ink portion of the corresponding colour on the heat transfer ink ribbon is selected in accordance with the colour information and ink of the selected ink portions is thermally transferred onto a paper by means of a thermal head. In this manner, the information is thermally transferred onto the paper one colour by another colour. The image forming section 10 is provided at its front upper portion with a control panel 11. The image forming section 10 is provided at its front side with a paper feed door 12 for manually feeding papers and at its upper rear side with a paper discharge tray 13 for discharging the copied paper. The copying machine body 9, which is located at the lower part of the image forming section 10, is removably provided with a paper feed cassette 14 in which a pile of papers are contained.

Figure 3:
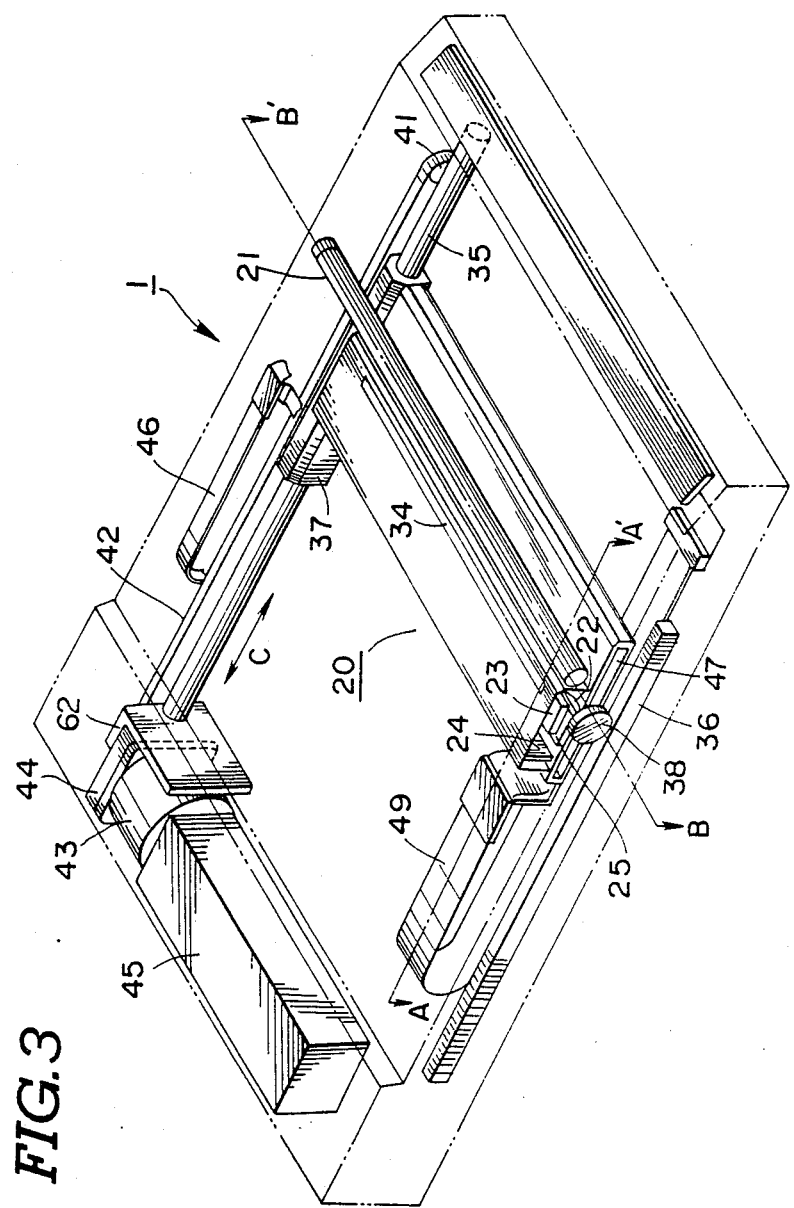
FIG. 3 is a perspective view showing an arrangement of the reading device.
Figure 5:
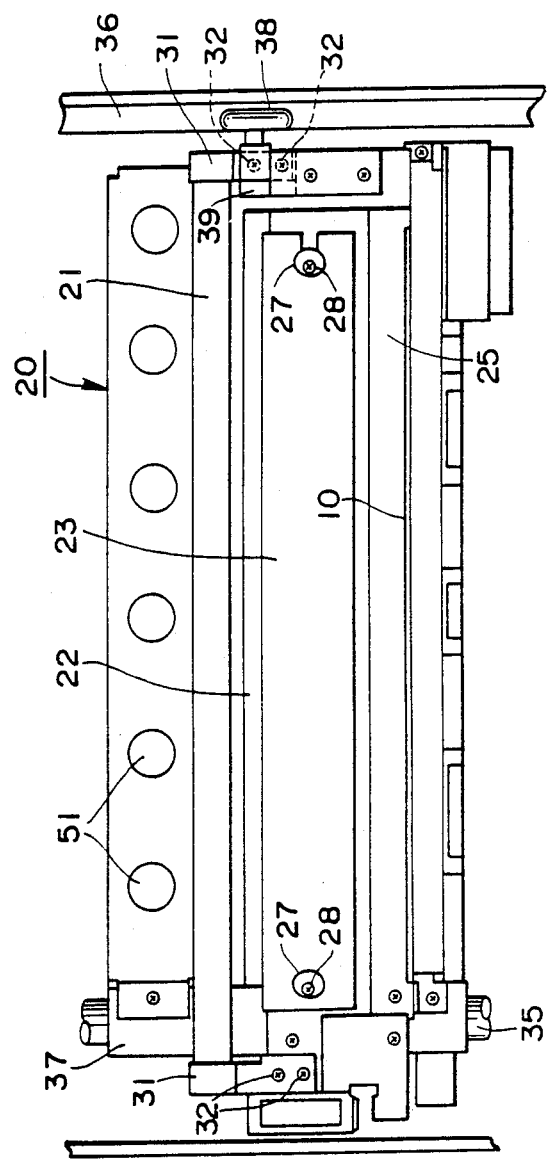
FIG. 5 is a plan view of the reading device of FIG. 3, as partially, omitted.

Next, the arrangement of the image information reading device 1 will be detailed with reference to FIGS. 3 to 6 in which FIG. 4 is a sectional view taken along line A—A' in FIG. 3, FIG. 5 is a plan view of the arrangement example and FIG. 6 is a sectional view taken along line B—B' in FIG. 3. The image information reading device 1 comprises a copy 1 and an original document reading section 20 for scanning an original document placed on the base 3 to read the image information of the original. The section 20 includes a fluorescent lamp (light source) 21 for illuminating an original document placed on the base 3, a mirror 22 for directing a light reflected by the original document in a direction parallel to the original document base 3, that is, in a direction parallel to the original document scanning direction, a beam condensing fiber lens 23 arranged on a light path of a light reflected by the mirror 22, so that its optical axis is parallel to the original document scanning direction, and a photoelectric converter (charge coupled device sensor) 24, these parts 21 to 24 being carried on a support block 25. More specifically, the beam condensing fiber lens 23 is fixedly supported on the block 25 by a lens pressing plate 26 so as to be moved by eccentric cams 27 for the focusing adjustment. Screws 28 are used to fix the position of the same 27. The mirror 22 is (secured to) the block 25 by a mirror pressing plate 29 and is also fixed at its upper end by one end side of the lens pressing plate 26. The photoelectric converter 24 is secured to the block 25 by a converter pressing plate 30 and is also fixed at its upper end by the other end side of the lens pressing plate 26. The fluorescent lamp 21 is held at its both ends to the block 25 by holders 31 which in turn are secured to the block 25 by means of screws 32. The screws 32 are also used to adjust the illumination angle of the lamp 21 so that the lamp 21 emits the maximum quantity of light. A lens cover 33 is formed to have a slit 34 which guides the reflected light from the original document to the mirror 22.

The block 25 carrying the above parts 21 to 24 in the above-mentioned manner is mounted on a guide shaft 35 and a guide rail 36 disposed in parallel with each other. More particularly, slidably mounted on the guide shaft 35 is a slider 37 to which one side of the block 25 is fixed. Mounted to the other side of the block 25 through a holder 39 is a roller 38 which rolls on the rail 36.

Provided on one and the other end sides of the guide shaft 35 (that is, on the rear and front sides of the present invention apparatus) are respectively a drive pulley 40 (see FIG. 7) a follower pulley 41 (see FIG. 3) around which a timing belt 42 runs. And the timing belt 42 is fixed at its one point to the block 25 through a stationary member (not shown). The drive pulley 40 is driven by a reversible pulse motor 43 which is mounted on a motor block 44 at one end side of the guide shaft 35. With such an arrangement, forward or backward rotation of the pulse motor 43 will cause reciprocal movement of the block 25 (original document reading section 20) parallelly along the lower surface of the document base 3 in directions illustrated by an arrow C in FIG. 3. Power to the fluorescent lamp 21 is supplied through a flat cable 46 from an inverter 45 provided at the rear side of the body of the information reading device 1. The image information is sent through the fiber lens 23 to the photoelectric converter 24 to be converted to an analog signal that is further converted to a digital signal by signal processing circuits 48 mounted on a printed circuit substrate 47. The digital signal is sent through a flat cable 49 to a recording device. In the device of this embodiment, the substrate 47 is provided under the block 25 to be parallel to the scanning direction. More particularly, a box-shaped casing 49, which is open at its bottom, is secured to the block 25 and slider 37. The printed circuit substrate 47 is mounted on the casing 49 by means of screws 50 so as to close the bottom opening of the casing 49. The substrate 47 is mounted with the signal processing circuits 48 for processings (such as amplification, A/D conversion and colour separation) of the output signal of the photoelectric converter 24, and since the substrate 47 has a width g of about 120 mm in the illustrated embodiment, it is possible to mount thereon circuits corresponding to three pieces of prior art substrates. Further, the casing 49 is provided with ventilating holes 51 for cooling of the printed circuit substrate 47.

In accordance with the aforementioned arrangement, since the beam condensing fiber lens 23 is disposed parallel to the scanning direction and the printed circuit substrate 47 is disposed parallel to the scanning direction under the mirror 22 and the fiber lens 23, the information reading device can be made thin.

Further, since the printed circuit substrate 47 is fixed to the underside of the casing 49 by means of the screws 50, the substrate 47 can be separately removed, thus allowing easy exchange, repair, adjustment, etc. of the substrate 47.

Furthermore, the cover 32 is provided with the ventilating holes 51 and thus the substrate 47 can be effectively cooled.

With such an arrangement, since the mirror 22, fiber lens 23 and photoelectric converter 24 are fixedly provided to the single block 25, the positional accuracy of these parts is determined only by the dimensional accuracy of the block 25 and therefore these parts can be assembled accurately and easily.

In addition, since any adjusting mechanism for adjustment of assembling accuracy is unnecessary, the information reading device can be made thin and light in weight while not increasing the number of necessary parts. In the above embodiment, a Selfox lens (Selfox is the trade mark registered by Nihon Itagarasu Corporation) marketed by Nihon Itagarasu Corporation is used as the fiber lens 23.

Explanation will be made as to another featured arrangement of the present invention by referring to FIGS. 7 to 11. More specifically, as shown in FIGS. 7 and 8, the guide shaft 35 is supported at its both ends by first and second adjusting means 60 and 80 so that the first and second adjusting means allow the independent adjustment of vertical position of the guide shaft 35, which will be detailed below with reference to FIGS. 7 to 11. The first adjusting means 60, as shown in FIGS. 7 to 9, comprises a vertical adjustment plate 62 mounted on the motor block 44 for vertical movement within a predetermined range for supporting one end of the guide shaft 35, and an eccentric cam 63 whose rotation causes vertical movement of the vertical adjustment plate 62. More particularly, the eccentric cam 63, as seen best in FIG. 10 (a) and (b), has a head portion 64 causing rotation of the eccentric cam 63, a cam portion 65 projecting from the back side of the head portion 64, and a screw hole 66 into which a mounting screw is inserted for mounting of the eccentric cam 63, the projected height (thickness) H of the cam portion 65 being smaller by a predetermined amount (about 0.2 mm) than the thickness t of the vertical adjustment plate 62. On the other hand, the vertical adjustment plate 62 is formed to have at its lower end a screw hole 68 elongated in its vertical adjustment direction for insertion of a fixing screw 67, and at its upper end a hole 69 elongated in a direction perpendicular to the vertical adjustment direction for insertion of the cam portion 65 of the eccentric cam 63. The vertical adjusting plate 62 thus arranged, as shown in FIGS. 7 to 9, is fixed to the motor block 44 by tightening the screw 67 inserted into the hole 68, and then the eccentric cam 63 is fixed to the motor block 44 by inserting the cam portion 65 of the eccentric cam 63 into elongate hole 69 and tightening a mounting screw 70. For adjustment, the fixing screw 67 and the mounting screw 70 are loosened respectively and the eccentric cam 63 is rotated to move the vertical adjustment plate 62 in the vertical direction. After the plate 62 has been moved to a desired position, the screws 67 and 70 are fixedly tightened respectively. In this embodiment, such adjustment can be made with an accuracy of about ±0.5 mm.

The second adjusting means 80, as shown in FIGS. 7, 8 and 11, comprises a vertical adjustment plate 82 mounted on a front frame 81 for vertical movement within a predetermined range for supporting the other end of the guide shaft 35, and an eccentric cam 83 whose rotation causes movement if the adjustment plate 82. That is, the eccentric cam 83 has the same arrangement as the eccentric cam 63 shown in FIG. 10 (a) and (b). On the other hand, the vertical adjusting plate 82 is formed to have at its right end a screw hole 82 for insertion of a fixing screw 84 and at its left end a hole 86 elongated in a direction perpendicular to the vertical adjustment direction for insertion of the cam portion 65 (see FIG. 10) of the eccentric cam 83. The vertical adjustment plate 82 thus arranged, as seen best in FIGS. 7, 8 and 11, is fixed to the front frame 81 by tightening the screw 84 inserted into the hole 85, and then the eccentric cam 83 is fixed to the front frame 81 by inserting the cam portion of the eccentric cam 83 into the elongate hole 86 and tightening a mounting screw 87. For adjustment, the fixing screw 84 and the mounting screw 87 are respectively loosened and the eccentric cam 83 is rotated to move vertically (in directions illustrated by arrows) around the screw 84 (supporting point). After the plate 82 has been moved to a desired position, the screws 84 and 87 are fixedly tightened respectively. In this embodiment, such adjustment can be made with an accuracy of about ±0.5 mm.

Further, though not shown in the drawings, adjusting means similar to the first and second adjusting means 60 and 80 are provided respectively at both ends of the guide rail 36. Provision of such adjusting means allows the block 25 (original document reading section 20) to be vertically adjusted at its four (front, rear, left and right) points. The flatness of the original document base 3 is determined substantially by the manufacturing and assembling accuracies of the frame. By providing such adjusting means, however, the parallel positional relation between the base 3 and document reading section 20 can be achieve. At the same time, it is possible to adjust the focus position of the optical system.

According to such an arrangement as has been disclosed in the foregoing, since the adjusting means 60 and 80 are provided for supporting the block 25 and for adjusting the vertical positions of the guide shaft 35 and guide rail 36 for movement of the block 25, the parallelism of the block 25 with respect to the document base 3 and the focus of the optical system in the document read-section 20 can be adjusted simply and accurately. In addition, since the adjusting means 60 and 80 comprise the vertical adjustment plates 62 and 82 and the eccentric cams 63 and 83 respectively as mentioned above, such adjustment can be achieved more simply, smoothly and accurately. As a result, the present invention can exhibit a remarkable effect especially when applied to a colour copying machine with a high resolution.

Although the present invention has been applied to the original document information reading devices of the heat transfer colour copying machine in the aforementioned embodiment, it should be understood that the intention is not to limit the invention only to the particular embodiment shown but rather to cover all alteration, modifications and equivalent arrangements possible within the scope of the appended claims. For example, the present invention may be applied to other information reading device of an electrophotographic, multi-colour laser printer or the like.

What is claimed is:

1. An image information reading apparatus comprising:
    a scanning means reciprocating parellel to a surface of an original and having a light source for emitting light toward the surface of said original, an optical means for leading light reflected from said original, and a photoelectric converting means for photoelectrically converting the reflected light led by said optical means;
    guide means for movably supporting said scanning means to guide the reciprocal movement of said scanning means in parallel with said original;
    drive means for driving said scanning means guided by said guide means to cause the reciprocal movement of said scanning means; and
    adjusting means for adjusting vertical position of said guide means, wherein said adjusting means comprises vertical adjustment plates vertically movable and fixedly supporting both ends of said guide means, and means for fixing said vertical adjustment plates at an arbitrary position.

2. An image information reading device as set forth in claim 1, wherein said guide means comprises a guide shaft disposed on one side of said scanning means and a guide rail disposed at the other side of said scanning means, said guide shaft and guide rail being parallel to each other.

3. An image information reading device as set forth in claim 2, wherein said scanning is fixedly provided at said one side with a slider slidably mounted on said guide shaft and at said other side with a roller rolling on said guide rail, the scanning means reciprocating along the guide shaft and the guide rail by means of said slider and roller.

4. An image information reading device as set forth in claim 1, wherein said drive means comprises a belt mechanism having a drive belt at least one point of which is secured to said scanning means and pulleys, and a motor for reversibly rotatably driving a drive side pulley of said belt mechanism.

5. An image information reading device as set forth in claim 1, wherein said adjusting means further comprises eccentric cams whose rotation causes vertical movement of said vertical adjustment plates within a predetermined range, and wherein each of said vertical adjustment plates is provided with a hole for insertion of a cam portion of said eccentric cam.

6. An image information reading device as set forth in claim 5, wherein said fixing means is a screw for fixing said eccentric cam at a desired angle position and the eccentric cam is formed with a threaded hole for said screw.

7. An image information reading device as set forth in claim 5, wherein said cam portion insert hole provided in said vertical adjustment plate is elongated in a direction perpendicular to said vertical adjustment direction.

8. An image information reading device as set forth in claim 6, wherein said vertical adjustment plate is formed with a threaded hole for a second fixing screw and the vertical adjustment plate is also fixed by tightening said second fixing screw inserted into said second threaded hole.

9. A picture image information reading device as set forth in claim 8, wherein said second threaded hole provided in said vertical adjustment plate is elongated in the vertical adjustment direction.

10. An image information reading device as set forth in claim 2, wherein said adjusting means comprises four adjusting members which fixedly support both ends of said guide shaft and guide rail, and adjust the vertical position of said guide means at four points.

11. An image information reading device as set forth in claim 10, wherein each of said four adjusting members comprises vertical adjustment plate for fixedly supporting an end of said guide shaft or guide rail and provided with a hole for insertion of a cam portion of an eccentric cam, said eccentric cam whose rotation causes vertical movement of said vertical adjustment plate within a predetermined range, and fixing means for fixing the vertical adjustment plate at a desired position.

12. An image information reading apparatus comprising:
    a light source for emitting light toward a surface of an original;
    light direction changing means for directing light reflected from said original toward a direction substantially parallel to a surface of said original, said reflected light including image information of said original;
    a beam condensing fiber lens means provided in a path of light after passing through said light direction changing means and whose optical axis coincides with a direction of the reflected original light changed by the light direction changing means;

photoelectric converting means which receives light after passing through said fiber lens means for photoelectrically converting said light; and a printed circuit substrate whose surface is parallel to said original surface and which is mounted with a signal processing circuit for processing an output signal of said photoelectric converting means, wherein said beam condensing fiber lens means is provided with an eccentric cam for focusing adjustment.

13. An image information reading device as set forth in claim 12, wherein said light direction changing means is a mirror.

14. An image information reading device as set forth in claim 12, wherein said light direction changing means, said beam condensing fiber lens and said photoelectric converting means are fixedly supported by a single block member at their predetermined positions.

15. An image information reading device as set forth in claim 14, wherein said light direction changing means, said fiber lens and said photoelectric converting means are fixedly mounted on said block member by a single pressing plate.

16. An image information reading device as set forth in claim 14, wherein said light source is a fluorescent lamp, said lamp being fixed to said block member by means of screws through a holder supporting both ends of the lamp, said screws being also used to adjust an illuminating angle of the lamp.

17. An image information reading device as set forth in claim 14, wherein said block member is mounted at its lower surface with a box-shaped casing open at its bottom, said printed circuit substrate being removably mounted on said casing to close said bottom opening.

18. An image information reading device as set forth in claim 17, wherein said casing is provided with ventilating holes for cooling said printed circuit substrate.

19. An image information reading apparatus comprising:

a scanning means reciprocating parallel to a surface of an original and having a light source for emitting light toward the surface of said original, an optical means for leading light reflected from said original document, and a photoelectric converting means for photoelectrically converting the reflected light led by said optical means;

guide means for movably supporting said scanning means to guide the reciprocal movement of said scanning means in parallel with said original;

vertical adjusting means for adjusting the vertical position of said guide means; and means for fixing said vertical adjusting means at a particular position.

20. An image information reading apparatus as set forth in claim 19, wherein said guide means comprises a guide shaft disposed on one side of said scanning means and a guide rail which is disposed at the other side of said scanning means said guide shaft and guide rail being parallel to each other.

21. An image information reading apparatus as set forth in claim 20, wherein said vertical adjusting means comprises four vertical adjusting members which fixedly support the both ends of said guide shaft and guide rail, and adjust the vertical position of said guide means four points, and said fixing means comprising four members disposed corresponding to the respective adjusting members.

22. An image information reading apparatus as set forth in claim 21, wherein each of said four adjusting members comprises a vertical adjustment plate for fixedly supporting an end of said guide shaft or guide rail and provided with a hole for insertion of a cam portion of an eccentric cam, said eccentric cam causing vertical movement of said vertical adjustment plate within a predetermined range when rotated.

* * * * *